DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 28, 1972

896 O.G. 1208

T896,050

COMMINUTED MEAT COMPOSITION CONTAINING UNDENATURED WATER-SOLUBLE LACTALBUMIN

Floyd C. Olson, 505 N. Midvale Blvd., Madison, Wis. 53705, and Donald W. Hoar, 2033 Colorado Ave., Sun Prairie, Wis. 53590

Filed Sept. 25, 1970, Ser. No. 75,707
Int. Cl. A22c
U.S. Cl. 99—108
No Drawing. 13 Pages Specification

Comminuted meat compositions such as sausage containing undenatured water-soluble lactalbumin. Lactalbumin concentrate is used in the comminuted meat composition in an amount in the range from 1% to 20%. Protein concentration in the lactalbumin concentrate may vary from 15 to 90%. The lactalbumin concentrate which is used in accordance with this invention is prepared from whey by methods which do not incur heat denaturation, and which do not require addition of chemicals, e.g., long chain polyphosphates, to the whey. Suitable lactalbumin concentrates may be prepared by concentration of whey by evaporation at low temperatures so as to crystallize and separate lactose, by electrodialysis, which provides lower ash content, by reverse osmosis with selected membranes which allows lactose and salt to go through while holding back lactalbumin protein, or by initial refinement of the dispersed protein by passing whey or slightly concentrated whey through a Sephadex column of selected resins which holds lactose and salt and allows lactalbumin to go through. In accordance with this invention, concentrated aqueous lactalbumin, or solid lactalbumin concentrates can be employed. The invention is particularly applicable to the manufacture of wieners, for example.